United States Patent
Kang

(10) Patent No.: US 6,809,857 B2
(45) Date of Patent: Oct. 26, 2004

(54) OPTICAL PREAMPLIFIER WITH ONE AMPLIFICATION UNIT

(75) Inventor: In-Kwon Kang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 133 days.

(21) Appl. No.: 10/214,318

(22) Filed: Aug. 8, 2002

(65) Prior Publication Data

US 2003/0099031 A1 May 29, 2003

(30) Foreign Application Priority Data

Nov. 28, 2001 (KR) ........................................ 2001-74699

(51) Int. Cl.[7] ........................................... H04B 10/12
(52) U.S. Cl. ................................................. 359/337.5
(58) Field of Search ............................... 359/337.5, 338, 359/339, 341.4

(56) References Cited

U.S. PATENT DOCUMENTS

| | | | | | |
|---|---|---|---|---|---|
| 6,021,245 | A | * | 2/2000 | Berger et al. | 385/123 |
| 6,163,398 | A | * | 12/2000 | Inagaki et al. | 359/337.5 |
| 6,320,687 | B1 | * | 11/2001 | Ishikawa | 398/147 |
| 6,359,726 | B1 | * | 3/2002 | Onaka et al. | 359/337.1 |
| 6,421,167 | B1 | * | 7/2002 | Cohen et al. | 359/337 |
| 6,462,862 | B2 | * | 10/2002 | Kinoshita | 359/334 |
| 6,476,961 | B1 | * | 11/2002 | Ye et al. | 359/341.43 |
| 6,621,625 | B1 | * | 9/2003 | Zhang et al. | 359/341.42 |
| 2001/0022683 | A1 | * | 9/2001 | Kosaka | 359/341.4 |
| 2003/0016439 | A1 | * | 1/2003 | Courtois et al. | 359/337.4 |
| 2003/0099030 | A1 | * | 5/2003 | Kumasako et al. | 359/334 |
| 2003/0099432 | A1 | * | 5/2003 | Furuki et al. | 385/24 |

* cited by examiner

*Primary Examiner*—Nelson Moskowitz
*Assistant Examiner*—Deandra M. Hughes
(74) *Attorney, Agent, or Firm*—Robert E. Bushnell, Esq.

(57) ABSTRACT

An optical preamplifier with an amplification unit is for amplifying an optical signal and compensating dispersion of the optical signal after receiving the optical signal from an optical transmitter, and thereof for supplying the optical signal to an optical receiver. The optical preamplifier includes a first wavelength division multiplexor WDM1 for multiplexing the inputted optical signal and a pumping light, an erbium doped fiber EDF for amplifying the optical signal multiplexed in the WDM1 in maximum, while non-linear phenomena do not happen in a following dispersion compensating fiber module DCFM, an optical isolator band pass filter ISOF for passing only the optical signal with a bandwidth of a predetermined wavelength among the optical signal amplified by EDF, the DCFM for damping an optical intensity of the optical signal within the optimum level of the optical signal for the optical receiver, while compensating the dispersion of the optical signal from the ISOF, and a first tap coupler dividing the optical signal from the DCFM in constant ratio for controlling the optical intensity of the pumping light and for being outputted to the optical receiver.

9 Claims, 7 Drawing Sheets

OPTICAL PREAMPLIFIER WITH ONE AMPLIFICATION UNIT

CLAIM OF PRIORITY

This application makes reference to, incorporates the same herein, and claims all benefits accruing under 35 U.S.C. §119 from my application entitled OPTICAL PREAMPLIFIER HAVING ONE STAGE CONFIGURATION earlier filed with the Korean Industrial Property Office on 28, Nov. 2001 and there duly assigned Serial No. 74699/2001.

BACKGROUND OF THE INVENTION

1. Field of the Invention

The present invention relates to an optical transmission system for a long distance, and more particularly, to an optical preamplifier including one amplification unit for outputting an optimum level of an optical signal to an optical receiver.

2. Description of the Related Art

Generally, as shown in FIG. 1, an optical transmission system includes an optical transmitter for generating an optical signal, an optical power amplifier OPA for amplifying powers of the optical signal, multiple optical line amplifiers OLAs according to an optical signal damping, an optical preamplifier OPRA for compensating damping amounts of the optical signal, and an optical receiver. The optical signal from the optical transmitter is transmitted to the optical receiver through OPA, OLAs, and OPRA.

The wavelength of the optical signal differs according to the optical transmission system. For the optical transmission system for a long distance, the wavelength of 1550 nm (nanometers) is typically used because it belongs to a bandwidth of a gain wavelength of the optical amplifier and the loss of the wavelength is small during a transmission. On the contrary, for the optical transmission system for a short or medium distance, the wavelength such as 1300 nm is used because the dispersion value of the wavelength is nearly zero even though the wavelength loss is large.

In other words, the wavelength of the optical channel belongs to a bandwidth of 1550 nm in an optical transmission system of high speed such as more than 10 Gbps (gigabits per second). As described in the above statements, such an optical channel of a bandwidth of 1550 nm has a dispersion value making some troubles in a long distance transmission of the optical signal. Therefore, to compensate the dispersion value of the optical fiber, a dispersion compensation fiber module DCFM is normally used in the OLA and the OPRA.

The DCFM compensates dispersions of the wavelength while transmitting an optical signal. However, when the optical intensity of the inputted optical signal is more than 0 dBm (decibels) because the damping amount, such as 8 dBm, is large and the diameter of the core is too small, a signal distortion can happen due to a non-linear phenomena. To solve such problems, the conventional optical transmission system for a high speed and a long distance includes an optical preamplifier with two amplification units and a DCFM between the two amplification units. The amplification unit is normally an erbium doped fiber EDF.

The conventional optical preamplifier including two amplification units, EDFs, is illustrated in FIG. 2. Generally, the conventional optical preamplifier applies two optical pumping methods to get gains. One method is that both ends of the DCFM respectively include a laser diode LD and a gain media such as an EDF to get gains in both ends of the DCFM independently. The other method is to use a wavelength division multiplexor WDM to get gains, a first gain and a second gain. The first gain is acquired by the way of dividing the output of a pumping LD by a first gain media EDF, and sequentially, the second gain is acquired by the way of dividing the output of a pumping LD by a second gain media EDF. The conventional optical preamplifier of FIG. 2 illustrates the latter pumping method.

Referring to FIG. 2, the conventional optical preamplifier includes a first erbium doped fiber EDF1 21, a DCFM, and a second erbium doped fiber EDF2 22. The EDF1 21 amplifies an input level of the optical signal, such as −10~−20 dBm, to an out level of about −3~−6 dBm. The EDF2 22 compensates the losses of the optical signal generated while the optical signal from the EDF1 21 is passing through the DCFM, and amplifies the optical signal to maintain the entire optical outputs in −3 dBm. The amplification procedures are illustrated as follows.

The EDF1 21 transmits the optical signal input from the input terminal IN to a first wavelength division multiplexor WDM1 while the first wavelength division multiplexor WDM1 inverse-multiplexes the optical signal to a management channel of 1510 nm and a signal channel of 1550 nm. Parts of the optical signal of 1550 nm inverse-multiplexed in the WDM1 are divided through a first tap coupler TAP1, and a photo detector LOS monitors optical losses during this process. The optical signal output from the TAP1 sequentially passes through a first optical isolator ISO1, and is received to one input terminal of a second wavelength division multiplexor WDM2. The other input terminal of the WDM2 receives a pumping light of 980 nm to multiplex the optical signal.

The optical signal multiplexed in the WDM2 is amplified through the EDF1 21, and a third wavelength division multiplexor WDM3 inverse-multiplexes the optical signal of 1550 nm and the pumping light of 980 nm. The optical signal of 1550 nm passes through an optical isolator band pass filter ISOF, and is received to the DCFM. The DCFM compensates the dispersion value included in the optical signal.

The EDF2 22 transmits the optical signal of 1550 nm compensated in the DCFM to a second optical isolator ISO2 and then to one input terminal of a fourth wavelength division multiplexor WDM4. The other input terminal of the WDM4 receives a pumping light of 980 nm inverse-multiplexed in the WDM3, and the WDM4 multiplexes the optical signal of 1550 nm and the pumping light of 980 nm. The multiplexed optical signal passes through the EDF2, and the EDF2 amplifies the optical signal of 1550 nm. The amplified optical signal of 1550 nm passes through a third optical isolator ISO3, and is transmitted into a manual turnable filter MTF. The MTF eliminates maximum amounts of an amplified spontaneous emission ASE generated during the process of amplifying the optical signal. Finally, the optical signal is transmitted into a second tap coupler TAP2. The TAP2 divides a portion of the optical signal for use in an auto power control APC circuit and outputs the other optical signal to the optical receiver through the output terminal OUT. The APC circuit adjusts an optical intensity outputted from the pumping LD to maintain the entire optical output regularly even though the optical intensity of the inputted optical signal is variable.

The input terminal of the above described conventional optical preamplifier receives an optical signal of −10~−26 dBm, and the output terminal outputs an optical signal of −3 dBm to the optical receiver. However, the optimum intensity of the optical signal input to the optical receiver is −6~−8 dBm. Therefore, an additional variable or fixed damper is necessary between the optical preamplifier and the optical receiver to adjust the output level of the optical signal from −3 dBm to −6~−8 dBm.

In other words, because the conventional optical preamplifier includes two amplification units, the configuration is complex and the production cost is increased. Furthermore, because the optical intensity of the optical signal from the optical preamplifier is higher than the optimum intensity of the optical signal to the optical receiver, an additional device is necessary.

SUMMARY OF THE INVENTION

It is therefore, an object of the present invention to provide an optical preamplifier with one amplification unit for amplifying an optical signal, compensating dispersion of the optical signal after receiving the optical signal from an optical transmitter and supplying the optical signal to an optical receiver.

It is another object to provide an optical preamplifier that is simpler to manufacture in order to reduce production costs without degrading the performance of the optical preamplifier.

It is yet another object to provide an optical preamplifier that can be operated in optimum modes without additional devices.

These and other objects may be achieved by the preferred embodiments of the present invention providing an optical preamplifier with one amplification unit for amplifying an optical signal, compensating dispersion of the optical signal after receiving the optical signal from an optical transmitter and supplying the optical signal to an optical receiver, as the optical preamplifier includes a first wavelength division multiplexor WDM1 for multiplexing the optical signal and a pumping light; an erbium doped fiber EDF for amplifying the optical signal multiplexed in the WDM1; an optical isolator band pass filter ISOF for passing the optical signal with a bandwidth of a predetermined wavelength only among the optical signal amplified by EDF; a DCFM for damping an optical intensity of the optical signal within an optimum level of the optical signal for the optical receiver, while compensating the dispersion of the optical signal from the ISOF; and a first tap coupler for dividing the optical signal output from the DCFM in constant ratio, and for outputting the optical signal to a circuit to control the optical intensity of the pumping light and to the optical receiver, wherein the optical signal in the EDF is amplified in a range of not generating a non-linear phenomena in the DCFM.

Furthermore, the present invention further includes a second tap coupler, installed in front of the DCFM, for dividing a portion of the optical signal; a photo detector LOS for detecting an optical intensity of the optical signal by using the optical signal divided in the second tap coupler; and an optical isolator ISO, installed between the second tap coupler and the DCFM, for interrupting a retrogression of the optical signal.

Further, the predetermined wavelength is 1550 nm.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Reference will now be made in detail to preferred embodiments of the present invention, example of which is illustrated in the accompanying drawings.

Figure 1:
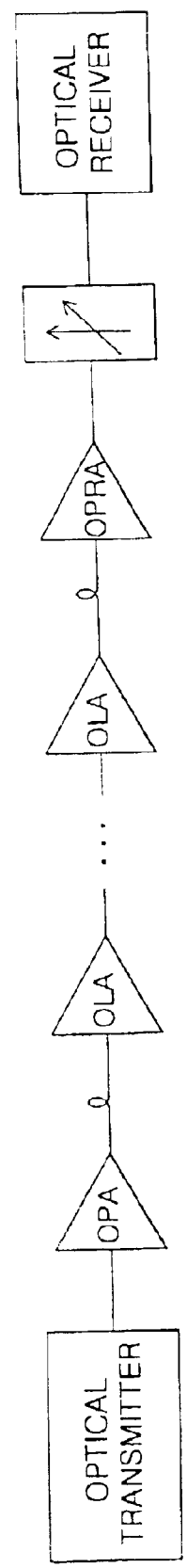
FIG. 1 is a schematic diagram illustrating a general optical transmission system for a long distance.
Figure 2:
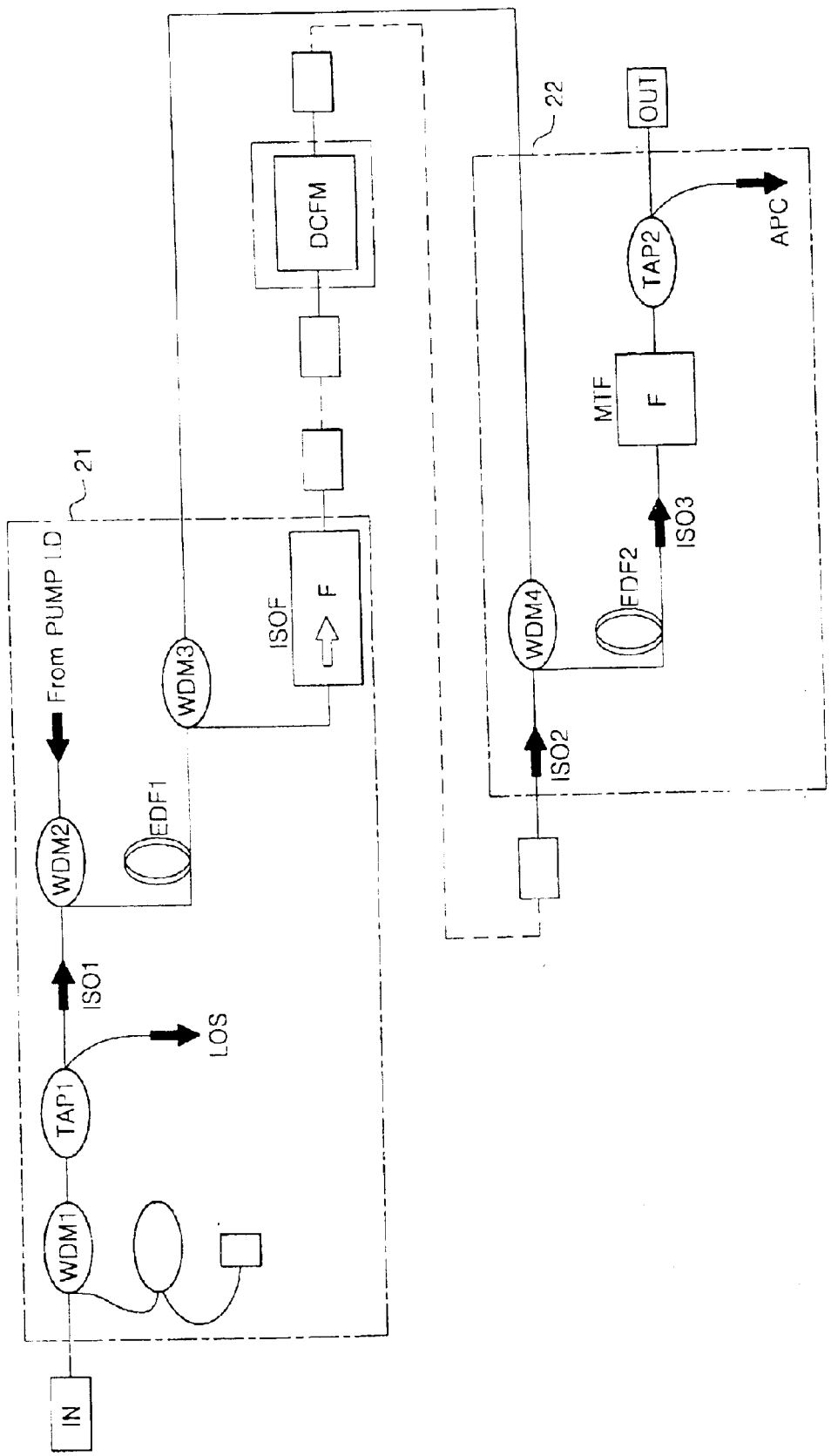
FIG. 2 is a schematic diagram illustrating a conventional optical preamplifier including two amplification units.
Figure 3:
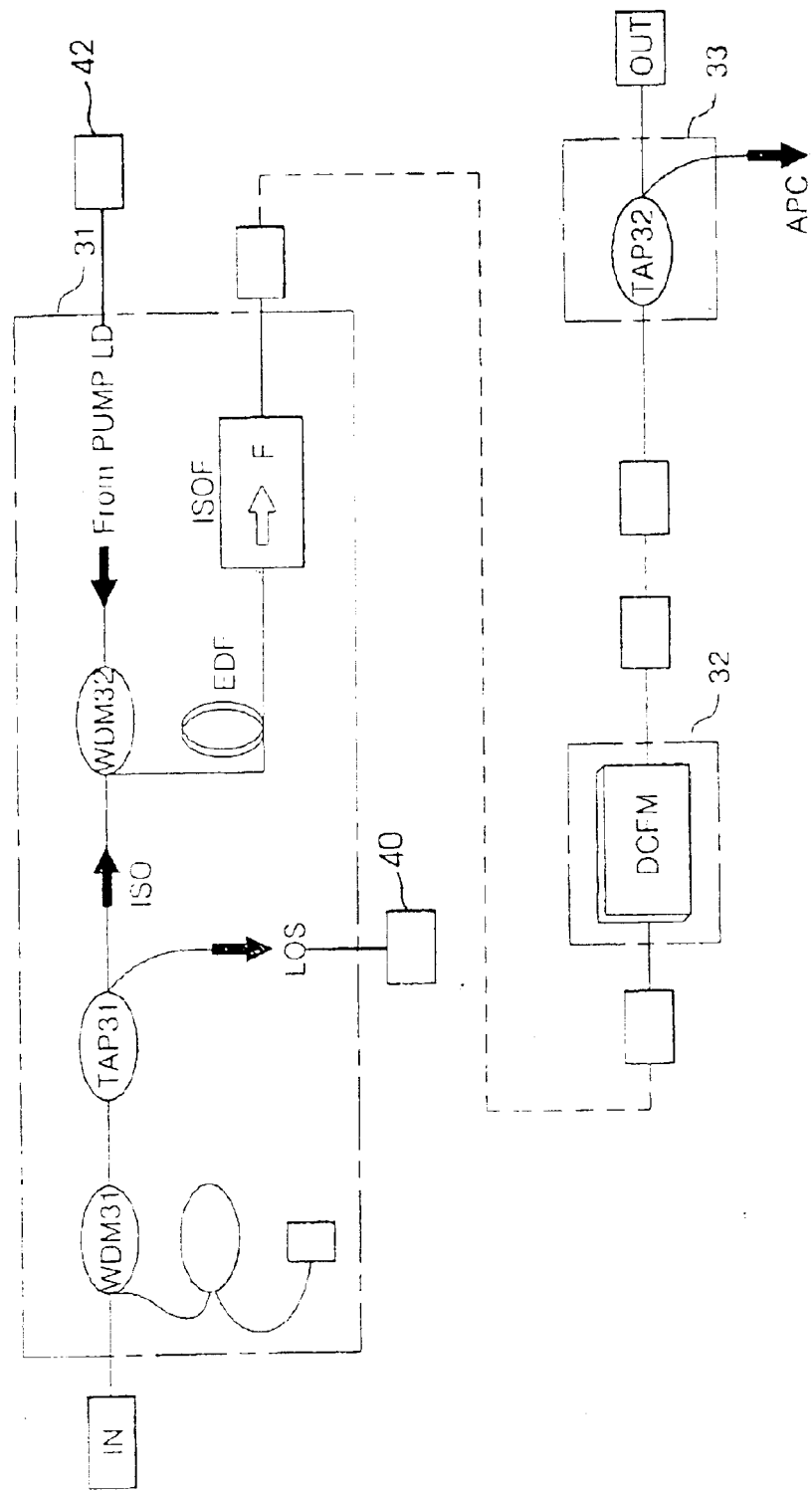
FIG. 3 is a schematic diagram illustrating an optical preamplifier with an amplification unit according to the present invention.

Referring to FIG. 3, an optical preamplifier with an amplification unit includes an erbium doped fiber EDF 31, a dispersion compensation fiber module DCFM 32 and an output terminal 33. The EDF 31 amplifies an input level of −10~−26 dBm of an optical signal to an output level of about 0 dBm. The DCFM 32 compensates a dispersion value included in the optical signal, as the DCFM 32 gets optical losses of about 7 dBm in the optical signal. The output terminal 33 divides the optical signal output from the DCFM 32, and thereof respectively inputs the optical signal to an optical receiver and an auto power control APC circuit (not shown). In other words, the optical preamplifier of the present invention eliminates a second amplification unit of a conventional optical preamplifier including two amplification units and increases the optical amplification degree of a first amplification unit to guarantee enough amplification for the optical signal.

Therefore, a final optical intensity outputted from the optical preamplifier of the present invention is −7 dBm, and is in range of the optimum intensity of the optical signal inputted to the optical receiver. In this case, when the optical signal of more than 0 dBm is inputted into the DCFM, a non-linear phenomena happens to the optical signal outputted from the DCFM. Accordingly, the optical intensity of the optical signal from the EDF should be avoided to be more than 0 dBm.

The more detailed explanations will be as follows.

The EDF 31 includes a first wavelength division multiplexor WDM31, a first tap coupler TAP31, an optical isolator ISO, a second wavelength division multiplexor WDM32, a pumping laser diode LD 42, an erbium doped fiber EDF as a gain medium, and an optical isolator band pass filter ISOF. The output terminal 33 includes a second tap coupler TAP32.

When the optical signal of −10~−26 dBm is inputted into an input terminal IN, the WDM31 divides the optical signal into a management channel of 1510 nm and a signal channel of 1550 nm, respectively. The TAP31 divides the optical signal of 1550 nm into an optical signal inputted into a photo detector 40 for monitoring losses of the optical signal LOS and an optical signal inputted into the ISO for being amplified. The optical isolator ISO is for interrupting a retrogression of the optical signal. The optical signal passing through the ISO is inputted into the WDM32. Then, the WDM32 multiplexes the optical signal of a bandwidth of 1550 nm (nanometers) wavelength with the pumping light of 980 nm generated from the pumping laser diode LD. The optical signal multiplexed in the WDM32 is amplified in the EDF, and the multiplexed optical signal is inputted into the ISOF. The optical signal in the erbium doped fiber EDF is amplified in a range of not generating (or preventing) a non-linear phenomena in the dispersion compensation fiber module DCFM. Because the ISOF only passes the optical signal with a bandwidth of 1550 nm and intercepts the optical signal with other bandwidths, an amplified spontaneous emission ASE amplified from the EDF is also eliminated.

The optical signal passing through the ISOF is inputted into the DCFM 32, and the DCFM 32 compensates the dispersion value of the optical signal. Basically, the dispersion compensation fiber module DCFM is for damping an optical intensity of the optical signal within an optimum level of the optical signal for the optical receiver, while compensating the dispersion of the optical signal from the optical isolator band pass filter. The optical signal compensated in the DCFM 32 is divided into an optical signal for APC by the TAP32 and an optical signal outputted from the optical preamplifier. The tap coupler TAP32 is for dividing the optical signal output from the dispersion compensation fiber module DCFM in a constant ratio, and for outputting the optical signal to a circuit to control the optical intensity of the pumping light and to the optical receiver. The optical signal outputted from the optical preamplifier is inputted into the optical receiver. The optical signal divided for the APC adjusts an optical intensity of the pumping light from the pumping LD, so that the optical intensity outputted from the optical preamplifier can maintain constantly even though the optical intensity inputted into the optical preamplifier varies.

Because a second EDF in the conventional optical preamplifier having two amplification units is eliminated, the optical preamplifier with an amplification unit according to the present invention does not generate an ASE in the bandwidth of 1530 nm relating to transmission errors.

Therefore, the optical preamplifier of the present invention does not have a manual turnable filter MTF for eliminating the ASE in the bandwidth of 1530 nm. Accordingly, the optical signal from the optical preamplifier can be controlled within the optimum level of the optical signal inputted into the optical receiver.

The performance of the optical preamplifier with an amplification unit according to the present invention will be explained as follows by referring to FIG. 4 to FIG. 11. The optical characteristic of the optical preamplifier is measured as a noise factor NF or an optical signal to noise ratio OSNR. Further, the optical link characteristic is measured for the optical preamplifier of the present invention.

Figure 4:
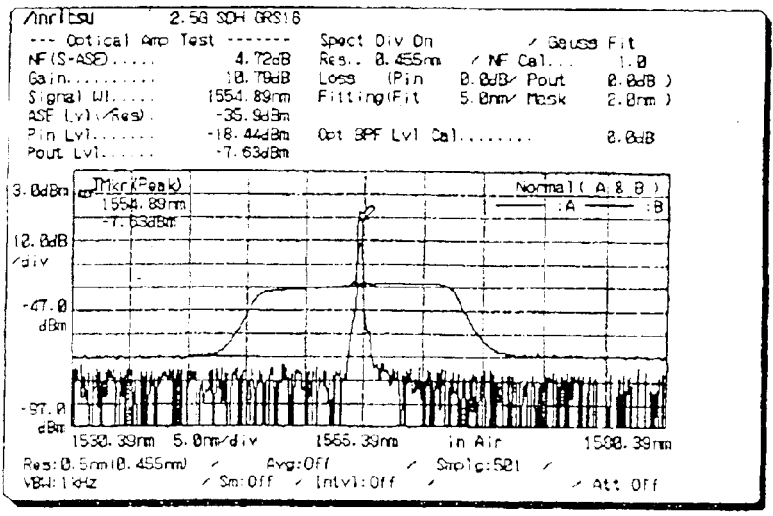
FIG. 4 is a graph for a noise factor NF of the optical preamplifier with an amplification unit according to the present invention, measured in a dispersion compensation fiber module DCFM made by Sumitomo company.
Figure 5:
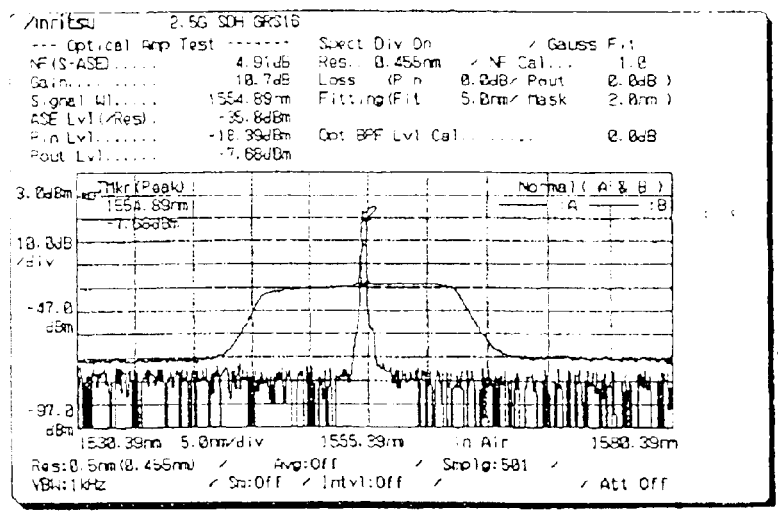
FIG. 5 is a graph for the NF of the optical preamplifier with an amplification unit according to the present invention, measured by the DCFM made by Lucent company.

FIG. 4 is a graph for a noise factor NF of the optical preamplifier with an amplification unit according to the present invention, measured in a dispersion compensation fiber module DCFM made by the Sumitomo company, and FIG. 5 is a graph for the NF of the optical preamplifier with an amplification unit according to the present invention, measured by the DCFM made by the Lucent company. The optical preamplifier with an amplication unit according to the present invention includes the dispersion compensation fiber module DCFM made by Sumitomo company in FIG. 4 while in FIG. 5, the amplification unit according to the present invention includes the DCFM made by the Lucent company.

Figure 6:
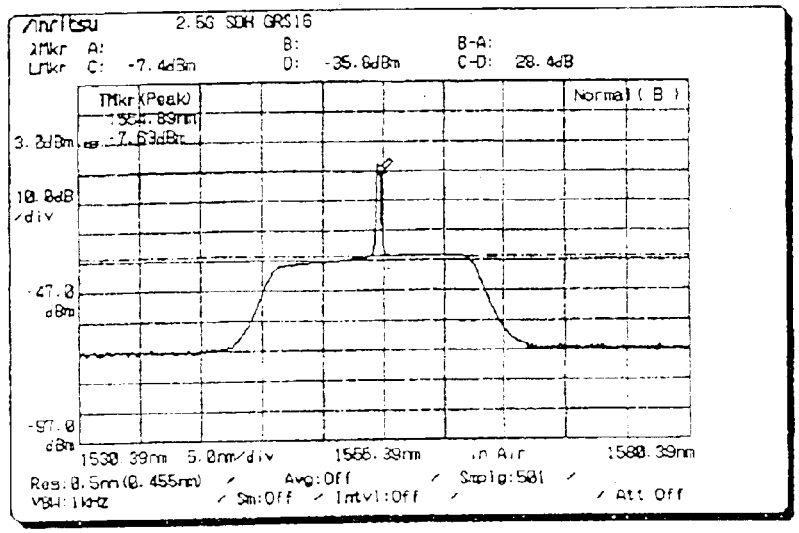
FIG. 6 is a graph for an optical signal to noise ratio ONSR of the optical preamplifier with an amplification unit according to the present invention, measured by the DCFM made by Sumitomo company.
Figure 7:
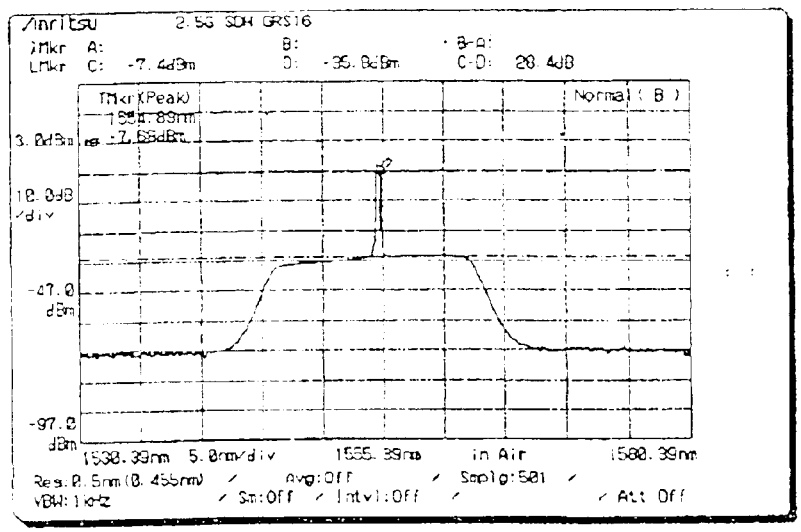
FIG. 7 is a graph for the ONSR of the optical preamplifier with an amplification unit according to the present invention, measured by the DCFM made by Lucent company.

Referring to FIG. 4 and FIG. 5, the NF of the optical preamplifier of the present invention is about 4.7~4.9 dBm, while the NF of the conventional optical preamplifier with two amplification units is 5.0 dBm in average. Comparing FIG. 4 with FIG. 5, the NF of the optical preamplifier measured by Sumitomo DCFM is 4.72 dBm, while the NF of the optical preamplifier measured by Lucent DCFM is 4.91 dBm. This is due to the difference in an insertion losses between Sumitomo DCFM and Lucent DCFM FIG. 6 is a graph for an optical signal to noise ratio ONSR of the optical preamplifier with an amplification unit according to the present invention, measured by the DCFM made by Sumitomo company and FIG. 7 is a graph for the ONSR of the optical preamplifier with an amplification unit according to the present invention, measured by the DCFM made by Lucent company. The optical preamplifier with an amplication unit according to the present invention includes the dispersion compensation fiber module DCFM made by Sumitomo company in FIG. 6 while in FIG. 7, the amplification unit according to the present invention includes the DCFM made by the Lucent company.

Referring to FIG. 6 and FIG. 7, the value of the ONSR of the optical preamplifier of the present invention is almost the same as the value of the ONSR of the conventional optical preamplifier. Further, the ONSR has no difference according to the kind of DCFM. This is because the difference between the values of the NFs is so small.

Figure 8:
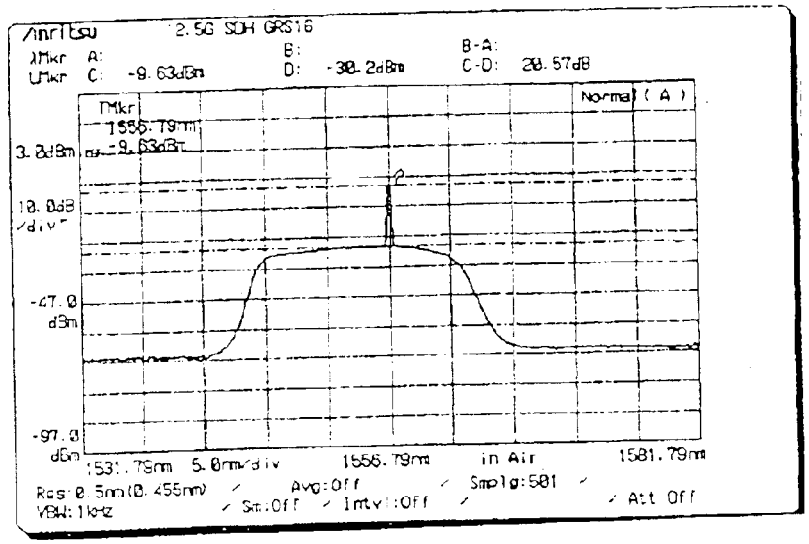
FIG. 8 is a graph for a test result measuring an optical link characteristic of the optical preamplifier with an amplification unit according to the present invention.

FIG. 8 is a graph for a test result measuring an optical link characteristic of the optical preamplifier with an amplification unit according to the present invention.

Referring to FIG. 8, the optical link characteristic is analyzed by measuring the ONSR of the optical signal passing through an optical fiber of 320 km (kilometers), and by detecting errors after linking to the optical transmission system of 10 G synchronous digital hierarchy SDH. After the optical signal with an input level of −15~−18 dBm passes through an optical links of 320 km, the OSNR measured in the output terminal of the optical preamplifier is 20.57 dBm, the C-D value in FIG. 8. The resolution factor is 7 dBm. Accordingly, the value of the OSNR added by the resolution factor, 27.57 dBm, is about 2 dBm as high as the value recommended by International telecommunications union-telecommunication standardization sector ITU-T, 25 dBm.

In other words, the optical link characteristic of the optical preamplifier with an amplification unit according to the present invention is as good as that of the conventional optical preamplifier, when the input level of the optical signal is −15~−18 dBm.

Figure 9:
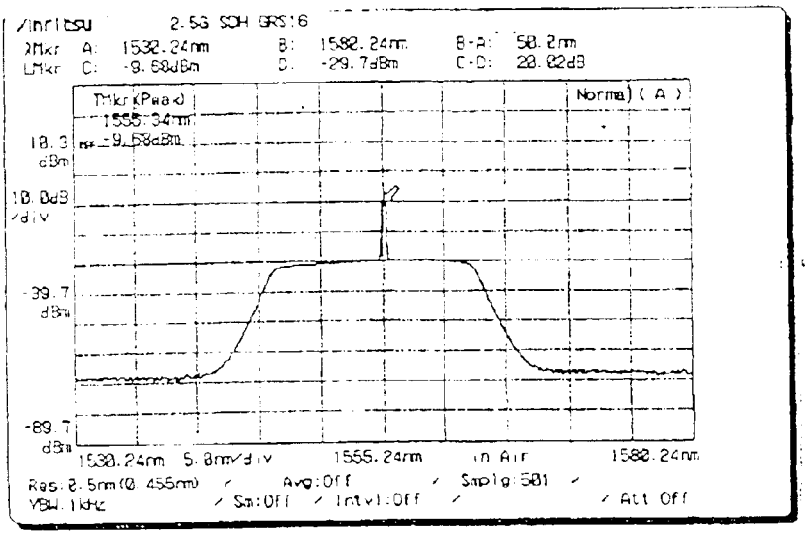
FIG. 9 is a graph illustrating the OSNR for the input level of −26 dBm in the optical signal of the optical preamplifier with an amplification unit according to the present invention while the back-to-back distance is 80 km.
Figure 10:
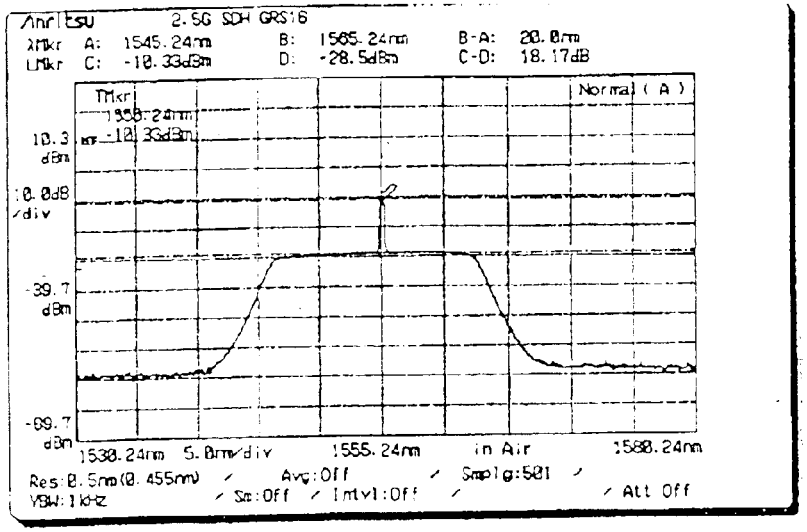
FIG. 10 is a graph illustrating the OSNR for the input level of −28 dBm in the optical signal of the optical preamplifier with an amplification unit according to the present invention while the back-to-back distance is 80 km (kilometers)
Figure 11:
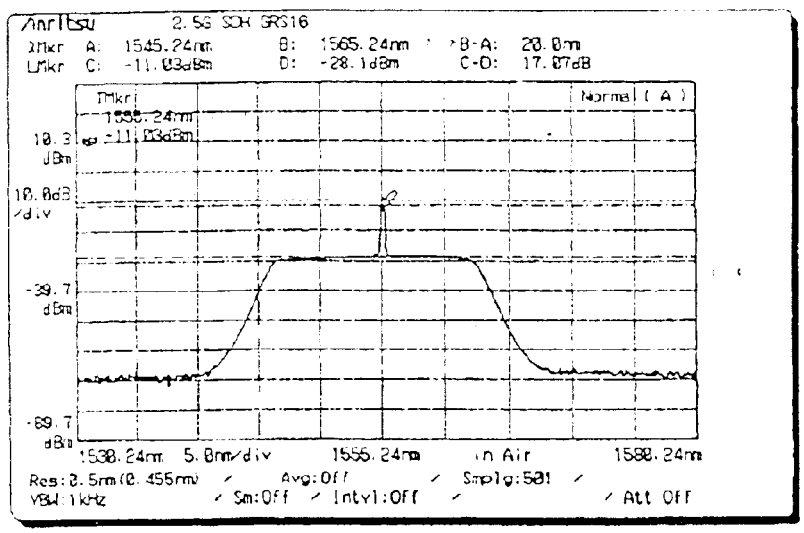
FIG. 11 is a graph illustrating the OSNR for the input level of −29 dBm in the optical signal of the optical preamplifier with an amplification unit according to the present invention while the back-to-back distance is 80 km.

FIG. 9 is a graph illustrating the OSNR for the input level of −26 dBm in the optical signal of the optical preamplifier with an amplification unit according to the present invention while the back-to-back distance is 80 km, FIG. 10 is a graph illustrating the OSNR for the input level of −28 dBm in the optical signal of the optical preamplifier with an amplification unit according to the present invention while the back-to-back distance is 80 km and FIG. 11 is a graph illustrating the OSNR for the input level of −29 dBm in the optical signal of the optical preamplifier with an amplification unit according to the present invention while the back-to-back distance is 80 km.

Referring to FIG. 9 and FIG. 10, the optical preamplifier with an amplification unit according to the present invention does not have an effect on the system performance, while the input level of the optical signal is −10~−26 dBm, even to −28 dBm. In other words, when the input level of the optical signal is −26 dBm, the ONSR is 27.02 dBm. Additionally, the ONSR is 25.17 dBm while the input level of the optical signal is −28 dBm. These values of the ONSR is in the range of a standard value, 25 dBm, recommended by ITU-T. However, as shown in FIG. 11, the ONSR is 24.07 dBm when the input level of the optical signal is −29 dBm. Accordingly, the system error happens because the value of the ONSR, 24.07 dBm deviates from the standard value, 25 dBm, by ITU-T.

As described in the above statement, the performance and the characteristic of the optical preamplifier is not inferior to those of the conventional optical preamplifier, when one EDF is used to amplify the optical intensity of the inputted optical signal and a DCFM is used to compensate the dispersion of the inputted optical signal.

Further, the optical preamplifier with one amplification unit reduces a production cost and a circuit size because one amplification unit and a manual turnable filter MTF are not applied. Additionally, because the optical intensity of the optical signal outputted from the optical preamplifier belongs to the optimum level of the optical signal inputted to the optical receiver, the optical receiver can be operated in optimum modes without any additional device.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An optical preamplifier with one amplification unit for amplifying an optical signal, compensating dispersion of the optical signal after receiving the optical signal from an optical transmitter and supplying the optical signal to an optical receiver, the optical preamplifier comprising:

a first wavelength division multiplexer for multiplexing the optical signal and a pumping light;

an erbium doped fiber amplifying the optical signal multiplexed in said first wavelength division multiplexer;

an optical isolator band pass filter for passing only the optical signal with a bandwidth of a predetermined wavelength among the optical signal amplified by said erbium doped fiber;

a dispersion compensation fiber module for damping an optical intensity of the optical signal within an optimum level of the optical signal for the optical receiver, while compensating the dispersion of the optical signal from said optical isolator band pass filter, the optical signal in said erbium doped fiber is amplified in a range of preventing a non-linear phenomena in said dispersion compensation fiber module; and a first tap coupler for dividing the optical signal output from said dispersion compensation fiber module in a constant ratio, and for outputting the optical signal to a circuit to control the optical intensity of the pumping light and to the optical receiver.

2. The optical preamplifier of claim 1, further comprising:

a second tap coupler, installed before said dispersion compensation fiber module, for dividing a portion of the optical signal;

a photo detector for detecting an optical intensity of the optical signal by using the optical signal divided in said second tap coupler; and an optical isolator, installed between said second tap coupler and said first wavelength division multiplexer, for interrupting a retrogression of the optical signal.

3. The optical preamplifier of claim 1, further comprising a second wavelength division multiplexer for multiplexing an inputted optical signal and second optical signal into an optical signal of the bandwidth of a predetermined wavelength.

4. The optical preamplifier of claim 3, further comprising a second tap coupler dividing the optical signal of the bandwidth of the predetermined wavelength from said second wavelength division multiplexer into a signal for monitoring loss in the optical signal and a second optical signal.

5. The optical preamplifier of claim 4, further comprising an optical isolator for amplifying the second optical signal from said second tap coupler and passing onto said dispersion compensation fiber module.

6. The optical preamplifier of claim 1, further comprising a second tap coupler, installed before said dispersion compensation fiber module, for dividing a portion of the optical signal.

7. The optical preamplifier of claim 6, further comprising a photo detector for detecting an optical intensity of the optical signal by using the optical signal divided in said second tap coupler.

8. The optical preamplifier of claim 6, further comprising an optical isolator, installed between said second tap coupler and said first wavelength division multiplexer, for interrupting a retrogression of the optical signal.

9. The optical preamplifier of claim 1, further comprising an optical isolator, installed before said dispersion compensation fiber module, for interrupting a retrogression of the optical signal.

* * * * *